Figure 1:
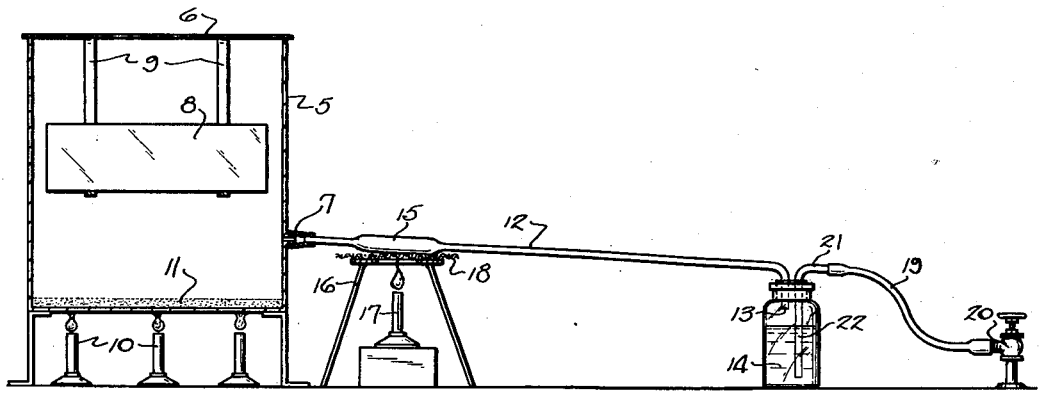

Dec. 6, 1949  R. A. GAISER ET AL  2,490,263
METHOD OF PRODUCING LOW LIGHT REFLECTING
FILMS ON GLASS SURFACES
Filed Jan. 20, 1943

Inventors
ROMEY A. GAISER,
MILTON F. SCHAIBLE.

By Frank Fraser
Attorney

Patented Dec. 6, 1949

2,490,263

UNITED STATES PATENT OFFICE 2,490,263

METHOD OF PRODUCING LOW LIGHT REFLECTING FILMS ON GLASS SURFACES

Romey A. Gaiser and Milton F. Schaible, Toledo, Ohio, assignors to Libbey-Owens-Ford Glass Company, Toledo, Ohio, a corporation of Ohio Application January 20, 1943, Serial No. 472,990

13 Claims. (Cl. 117—106)

The present invention relates broadly to the reduction of surface reflections from and the increase in transmission through transparent bodies such as glass.

More particularly, the invention has to do with the treatment of a surface of a light-transmitting article (e. g., a sheet or plate of glass, lens, prism or the like) whereby substantially to alter the reflection of light from such surface and to the provision of improved light-transmitting articles produced in accordance with the invention.

Reflection of light from glass surfaces is objectionable from the standpoint of glare, eye strain, poor vision, etc. However, in some cases, reflection is seriously detrimental and occurs only at the expense of the efficiency of the apparatus involved. As an example, reflection of light from the surfaces of the several glass elements in a periscope, bomb sight, binoculars, etc., becomes a serious problem—often reducing the transmission of the light to lower than 50% of the original. Oftentimes too, in these instruments, "ghost images" are formed which are particularly disturbing to the observer.

Double glazing units, which, for example, are used in airplanes for defrosting and other purposes, becomes objectionable because of the four-reflecting surfaces presented. A pilot is thereby subjected to doubly disturbing reflections of his own lights, lights of other planes, landing field lights, etc.

Reduction of reflection can be accomplished by producing a diffusing surface on the glass, but this is accompanied by a corresponding reduction of light transmission. Obviously, this is not desirable where objects are to be viewed through the glass articles. Other methods of reducing specular reflections from glass are also known. These include vacuum deposited films, metallic soap films and films produced with hydrofluoric acid. Such methods, however, all have some objectionable features, such as the expense involved, the time factor, the stability of the film, etc.

An object of this invention is to provide a method whereby a glass article may be chemically treated to produce a surface which is characterized by little or no reflection of light and a corresponding increase in light transmission.

Another object of the invention is to provide a method of treating optical glass surfaces such as prisms, lenses, etc., so as to reduce reflection and thereby increase transmission of light through these optical elements. Thus, the efficiency of optical devices such as periscopes, binoculars, microscopes, telescopes, bomb sights or any other device using multiple optical elements will be greatly improved.

A further object of this invention is to provide a method of chemically treating the surfaces of sheets or plates of glass so as to reduce or substantially eliminate objectionable reflection of light and thereby increase the transmission of light therethrough. When so treated, these plates or sheets, when used as windows, multiple glazings, dial, gauge and picture coverings, and similar transparent shields, become low reflecting and high transmitting. By the utilization of this chemical treatment, the elimination of eye strain produced by viewing objects through the usual glass panes is practically eliminated.

As is well known, when light strikes an ordinary glass medium, part of the light is transmitted and part of the light is reflected. According to Fresnel's formula for light at normal incidence, the amount of light transmitted is equal to the original light diminished by the amount of light reflected, $$L_t = L_0 \left[ 1 - \left( \frac{n_2 - n_1}{n_2 + n_1} \right)^2 \right]$$

where $n_2$ and $n_1$ are the refractive indices of the glass and the surrounding medium respectively. Thus, for air and a glass of index of refraction 1.52, the amount of light transmission for each surface would approximate 96% of the original light and the amount of reflection would approximate 4%. Therefore, considering both surfaces of a piece of glass of index of refraction 1.52 in an air medium, roughly, and without taking absorption into account, 8% of the light striking it at normal incidence would be reflected and 92% would be transmitted.

Methods of treating glass to reduce surface reflection have been known for some time. Perfect results are obtained and reflection is reduced to zero when there is formed on the glass a substance having an index of refraction which is the geometric means between the indices of refraction of the glass and the surrounding medium, and when the thickness of this substance is $$\frac{x}{4}$$

the length of the impinging monochromatic light, ($x=$ any small odd integer, one being the ideal number). Thus, a glass with an index of refraction of 1.52 as viewed in air would give no reflection of monochromatic light of wave length .5892 micron, if the glass was surfaced with a material of index of refraction 1.23, to a thickness of .1473 micron.

Obviously, a suitable transparent substance having an index of refraction of 1.23 is not available at the present time. However, substantial reduction of reflection is obtainable by using a substance whose index of refraction is intermediate that of the glass and the surrounding medium and when the thickness of the film is controlled. Control of film thickness is maintained by observing the color change and stopping the filming process at the desired color. As the film thickness increases, the color progressively appears light brown, dark brown, red purple, purple, purple blue, deep blue, light blue and so on into a golden shade. Increasing film thickness from this point results in reds and greens. The explanation of these color changes lies in the elimination by interference of various components of the visible spectrum. For instance, when a ray of multi-wave length (white) light is reflected from a surface, that part of the incident light which meets a reflected ray one half-wave length or any odd number of half-wave lengths out of phase will be destroyed by interference.

A simple example of this well known phenomenon could be illustrated by reflecting monochromatic light of a definite wave length from a glass surface. Complete destruction of this light would occur if the glass were filmed with the proper material to a thickness of ¼ of the wave length of the impinging light. The ray entering the film would travel ¼ of a wave length and the reflected portion in returning through the film would travel another ¼ of a wave length. Thus, it would arrive at the surface of the film ½ a wave length out of step and at the proper time to be destroyed by the impinging gray. Reflection is decreased thereby and transmission is correspondingly increased, because the change of phase which takes place in the very act of reflection adds vectorially to the amplitude of transmitted ray causing reinforcement.

As a result, when the film appears brown, the blue and green components of white light are being destroyed by interference; when it appears purple, the green and yellow are being destroyed; and, when it appears blue, the yellow component of the impinging white light is being destroyed. It should be understood that the color of the film is determined when viewed by reflected light incident at an angle not too far removed from the normal to that surface.

Since the eye is more sensitive to a mixture of the yellow and the green portion of the spectrum, it stands that the elimination of these rays by interference would produce the lowest reflectance of multi-wave length light from a surface. Thus, a purple colored film, reflecting blue and red rays and eliminating green and yellow rays, would be desirable for low reflectance of white light.

Various methods of producing low reflecting films have been proposed including vacuum deposited films, films formed of metallic salts of fatty acids such as barium stearate, and films formed from hydrofluoric acid vapor. However, none of these methods have been found to be entirely satisfactory due to the length of time required to produce the film, the instability of the film, the technical difficulties encountered, the need of expensive equipment, the fact that only one side of the glass article can be coated at one time, or a combination of these objections.

It is an aim of this invention to provide a new and improved method of producing low reflecting films on glass surfaces which is more economical and less time-consuming than prior known methods, which is more flexible in that by varying the ingredients of the filming material the filming time can be changed, which requires less technical skill in the formation of the film, and which produces a uniform film which is both rugged and stable.

More particularly, the method of this invention involves the formation of silicon tetrafluoride, and its subsequent attack on the components of the glass surface. Various methods of producing silicon tetrafluoride having been employed including decomposition of the fluosilicates by heat, attack of some metallic fluorides on the silica of the glass, heating of some of the fluorides with silica, and the reaction of silica with calcium fluoride and concentrated sulfuric acid.

Among the fluosilicates which have been used by us in producing low reflecting films are potassium fluosilicate, sodium fluosilicate, barium fluosilicate, lithium fluosilicate, lead fluosilicate, and calcium fluosilicate. It further appears that all the fluosilicates will produce successful results because of their decomposition by heat into metallic fluorides and silicon tetrafluoride, the silicon tetrafluoride then reacting with the metallic oxides of the glass to form fluosilicates.

Metallic fluorides such as zinc fluoride, aluminum fluoride, and lead fluoride, have also been used by us with success in forming low reflecting films. The action of these fluorides appears to result in an attack on the silica of the glass to form silicon tetrafluoride. The silicon tetrafluoride then unites with the other constituents of the glass to form fluosilicates, mainly of sodium and calcium.

Mixtures of fluorides with silicon dioxide, in the form of sand, feldspar or glass wool, have also been used successfully to produce low reflecting films on glass surfaces. Some of the fluorides that have been used with silica include—calcium fluoride, lead fluoride, aluminum fluoride, zinc fluoride, titanium tetrafluoride, ammonium fluoride, and potassium borofluoride. These fluoride compounds also react to form silicon tetrafluoride which in turn acts upon the glass surface in the manner above described.

Further, the usual laboratory method of producing silicon tetrafluoride (calcium fluoride+sulfuric acid+silicon dioxide=calcium sulfate+water+silicon tetrafluoride) has been used successfully in producing low reflecting films. This method may suggest hydrogen fluoride as the filming agent. However, calcium fluoride and silicon dioxide alone, at the temperature of the electric arc, produces silicon tetrafluoride which reacts with glass to form good low reflecting films. This is true even though great care is taken to eliminate the presence of the hydrogen ion, which in turn eliminates the possibility of hydrofluoric acid as the filming agent.

Several procedures have been employed by us in treating glass surfaces with the aforementioned filming agents. The use of the electric arc has already been mentioned. This was done by drilling two opposing holes in the sides of a 14.5 cm. high Denver fire clay crucible, 2 cm. from the bottom of the crucible, to accommodate the carbon electrodes. A mixture of calcium fluoride and silicon dioxide was placed in the crucible to just cover the electrodes. Pieces of glass were placed on top of the crucible and films of a low reflecting purple color were obtained on one side of the glass in a 3 to 5-minute exposure.

Another procedure used was to place the filming compound or mixture to a depth of 2 to 4 cm. in a 16.5 cm. high Denver fire clay crucible or in an iron crucible, with heat being applied to the bottom of the crucible by means of a Bunsen or Meeker burner adjusted to a full flame. The glass was placed on top of the crucible and filmed in from 1 to 30 minutes per side according to the compound or mixture used.

The procedures described above produced low reflecting films of varying degrees of color evenness, apparently because of the unevenness of the glass temperature necessarily created by these methods. Also, only one side of the glass could be filmed at one time. This is of course time-consuming and contains an element of failure due to the doubled chances of dust collection, breakage, etc. It is therefore also an aim of this invention to provide a method whereby both sides of a sheet of glass or both sides of several sheets can be filmed simultaneously.

Figure 2:
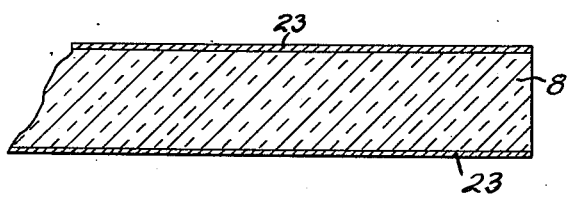

In the drawing:

Fig. 1 illustrates a preferred type of apparatus which may be employed in the filming operation; and Fig. 2 is a fragmentary sectional view through a sheet of glass which has been filmed in accordance with the invention.

The apparatus illustrated in Fig. 1 has been successfully employed in securing uniform low reflecting films and comprises an iron tank 5 closed by a fairly tight fitting cover 6. The tank is provided in one side wall thereof and relatively closely adjacent its bottom with an inlet 7 to permit the entrance of gaseous substances without removal of the cover 6. The glass sheet or sheets 8 to be filmed are supported vertically within the tank and for this purpose hangers 9 or any other suitable type of supporting means may be provided for said sheets. Various fluorides, silicofluorides, or mixtures of both, referred to above, have been used successfully to produce uniformly colored low reflecting films in this type of tank when heated by burners 10 placed beneath said tank. Sodium silicofluoride 11, placed in the bottom of the tank to a depth of 2 to 4 cm., is the compound usually used because it is as satisfactory as any of the other filming agents and at the same time comparatively inexpensive.

The glass sheets 8 may be filmed to a purple color on both sides in this tank using sodium silicofluoride, in time intervals of from 5 to 20 minutes, depending on the condition of the compound. The compound is not completely decomposed in a short time and the same quantity may be used week after week without decreasing the filming time appreciably if the compound is stirred occasionally. A mixture of sodium silicofluoride and zinc fluoride in equal quantities has been used frequently by us as a filming mixture in this method. Its action is faster than the sodium silicofluoride used alone, producing purple colored films in shorter time limits.

It has been found that the introduction of a stream of various gases into the tank 5 through the inlet 7 during the filming operation is beneficial in securing uniform films. It appears that a regulated stream of warm dried air to circulate the silicon tetrafluoride is as beneficial as anything in this respect, the action being a mechanical one utilized to circulate the silicon tetrafluoride, the gases having no chemical action therewith. The fact that the cover 6 of the tank does not fit absolutely tight permits the desired circulation to take place in the tank.

A stream of air can be introduced into the tank through the inlet 7 from a glass tubing 12 having its inner end fitted within said inlet and its outer end 13 turned downward and received within a wash bottle 14 containing concentrated sulfuric acid. The glass tubing 12 may be provided intermediate its ends with an enlarged portion 15 supported upon a tripod 16. The enlarged portion 15 of the glass tubing is provided to facilitate the heating of the air which may be accomplished by a suitable burner 17. In order to minimize the liability of breakage of the glass tubing upon heating, a wire gauze or netting 18 can be interposed between the top of the tripod 16 and the enlarged portion 15 of the tube.

The air before entering the tank is washed through the concentrated sulfuric acid contained in the wash bottle 14. This supply of air may be fed into the wash bottle through a flexible tubing 19 leading from a valve 20 in the air supply line and attached at its opposite ends to a glass tube 21 having a portion 22 thereof immersed in the sulfuric acid contained in the wash bottle 14. An advantage in washing the air stream with sulfuric acid is to remove excess moisture from the air before it enters the tank, since the presence of such moisture would be detrimental to the proper filming of the glass. The speed of the stream of air entering the tank is of importance and should be so controlled as to obtain a uniform film.

In the practice of this method, preheating of the glass is important and it is suggested that it be heated in the neighborhood of 125° C. Two reasons for preheating are: First, most commercial glass cleaners are found to leave a greasy film on glass surfaces when viewed by the proper light. Preheating the glass has a beneficial action in removing some of this material. Secondly, silicon tetrafluoride has a great affinity for water forming silica and hydrofluosilicic acid according to the following equation:

$$3SiF_4 + 2H_2O = 2H_2SiF_6 + SiO_2$$

Under these circumstances the resulting silica is held tenaciously to the glass in a form that is objectionable in low reflecting films. Preheating of the glass removes the adsorbed moisture and reduces the probability of securing objectionable substances on the surface of the glass.

The temperature of the glass at the time it is placed in the filming tank must be high enough to insure the absence of adsorbed water. Filming time is decreased slightly as the temperature of the glass, at the time of entrance, is progressively increased from 125° C. to 500° C., but the time gained is not great enough to warrant the higher preheating temperatures. Conditions which have been found suitable include preheating the glass to be filmed to approximately 125° C., then immediately entering it into the tank containing sodium fluosilicate that has reached a temperature of approximately 400° C. It is to be understood that these temperatures are not demanded and that large variations from the stated temperatures may be employed with success.

The following is one specific example of producing a low reflecting film on a glass surface in accordance with this invention. In this example, it will be understood that any of the compounds or mixtures set forth above may be employed and also that conditions of time, temperature, etc., could be varied.

A sheet of good quality glass, 12 inches long x 6 inches wide x ⅛ inch thick, is cleaned thoroughly, such as with Bon Ami or optical rouge. All ordinary visible traces of the cleaning compound are removed and dust particles are blown off the glass surface by a stream of air. The glass is then placed in a preheating oven and brought to a temperature of 125° C. In the meantime, the tank 5 has been charged with sodium fluosilicate 11 to a depth of 2 cm. and heated with the burners 10 to a temperature of 425° C. Any serious quantity of moisture in the sodium fluosilicate should be removed during this preheating operation. The glass sheet 8 is then introduced in the tank and supported by the hangers 9 so the glass is about half way between the top and bottom of the tank. The cover 6 is then placed on the tank and a stream of air is introduced into the inlet 7. The air stream is passed through the concentrated sulfuric acid in wash bottle 14 for desiccation, then heated by means of the burner 17 underneath the glass delivery tube 12.

The heating of the sodium fluosilicate produces vapors which attack the glass and effect the formation of a low reflecting film upon the surface thereof. This attack results in a chemical change in the surface composition of the glass caused by the action of the silicon tetrafluoride obtained by heating of the filming agent. In other words, the silicon tetrafluoride acting on the constituents of the glass form new compounds of index of refraction intermediate the main body of glass and the surrounding air and of a thickness approximately ¼ the wave length of the impinging light. More particularly, the silicon tertafluoride reacts with the metallic oxides of the glass to form fluosilicates.

At the end of 5 minutes the glass is removed from the tank, the time having been previously determined by test sampled filmed to the desired color. If the propor color, by some chance, has not been attained, the glass may be returned to the tank for further treatment without seriously impairing the evenness of the color. If desired, windows of a transparent material could be inserted in the sides of the tank for visual inspection of the film color during the filming operation.

The film obtained by this method, as it comes from the filming tank 5, consists mainly of fluosilicates. These compounds do not adhere well to the underlying glass surface and are therefore easily removed by water or by rubbing with a towel. For this reason, it becomes imperative to change the composition of the film by heat. This heating operation changes part of the fluosilicates to fluorides by driving off the silicon tetrafluoride from these fluosilicates. Thus, the final low reflecting surface is composed of fluorides mainly, plus some silicofluorides. These statements are derived from chemical analyses of the film and are supported by a table of weights set forth below.

The operation of changing some of the fluosilicates to fluorides is achieved by heating the film at around 500° C. for about two hours followed by unaccelerated cooling merely as a means of preventing breakage. Within limits, this metamorphosis takes place at higher and lower temperatures, the time required being indirectly proportional to temperature. However, it is obvious that at too low a temperature the necessary chemical change will not occur. The time and temperature as stated above is sufficient to produce a change which results in a surface rugged enough to withstand repeated washings, gentle rubbing with a towel, and the application and removal of Scotch cellulose tape without serious damage being done to the film.

The heating operation reduces the thickness of the film and changes the color correspondingly in proportion to the time and temperature used. Thus, if the finished film is to be a purple color, it is necessary to film the glass to a blue shade, while if deep blue is the desired color, light blue should be the color of the film before heat treatment, if the time and temperatures stated in the preceding paragraph are followed. Washing after heat treating improves the low reflecting qualities of the film.

The film before heat treatment is not soluble in alcohol and glacial acetic acid, but is soluble in the common acids such as sulfuric, nitric, hydrochloric and phosphoric. It might be stated here that a dip in glacial acetic acid is beneficial to the film both before and after the final chemical change takes place. There is no solvent action, but the color of the film seems to be improved to a deeper hue.

From the above, it will be seen that in accordance with this invention low reflecting films are produced on glass surfaces by using silicon tetrafluoride as the filming agent. Reduction of the reflection of light from both surfaces of a glass sheet to a figure in the neighborhood of 1% may be secured by the use of silicon tetrafluoride. This method is distinguished from prior methods of coating in that the action of the silicon tetrafluoride on the glass results in a chemical change in the glass surface which produces the film. In other words, the surface or film 23 produced on the glass sheet 8 (Fig. 2) is mainly a mixture of fluosilicates and fluorides produced by the action of silicon tetrafluoride on the constituents of the glass followed by heat treatment described above. That the method results in a chemical change in the glass surface has been definitely determined by the fact that the glass after filming weighs less than it does before filming. While the reduction in weight is comparatively small, yet it is measurable to the extent of showing that the action of the silicon tetrafluoride does not simply produce a coating on the glass but rather alters the composition thereof. Furthermore, it has been found that a second chemical change, which takes place by heating the film and which makes the resultant product more desirable, is also attended by a further decrease in the weight of the glass article.

This is clearly shown by the following table of weights of a number of glass articles before filming, after filming and after heat treatment:

| Article number | Weight of article after heating at 500° C. | Weight after filming | Weight after heat treatment | Loss in weight from filming | Loss in weight from heat treatment |
| --- | --- | --- | --- | --- | --- |
| 1 | 27.5731 | 27.5719 | 27.5714 | .0012 | .0005 |
| 2 | 27.9051 | 27.9037 | 27.9031 | .0014 | .0006 |
| 3 | 27.2970 | 27.2954 | 27.2947 | .0016 | .0007 |
| 4 | 27.8511 | 27.8499 | 27.8493 | .0012 | .0006 |
| 5 | 27.9468 | 27.9451 | 27.9444 | .0017 | .0007 |
| 6 | 28.0464 | 28.0445 | 28.0436 | .0019 | .0009 |

All weights in the above table are in grams. The filming operation was carried out as above described using sodium fluosilicate as the filming agent. All of the glass articles were seamed before filming to reduce the possibility of loss by chipping. The glass articles were cooled before weighing, which was carried on in a desiccator over phosphorus pentoxide. It was further found that the loss in weight of a glass article during filming increases as the thickness of the film increases. This explains the variation in weight loss in the preceding table.

It has also been found that, when using the fluosilicates, the film thickness and therefore the color of the film can be controlled to give low reflection of light in predetermined spectral regions. For instance, if low reflection of blue light is desired, a green or brown film, preferably brown, should be used; if low reflection of red light is desired, a blue film should be used; if low reflection of green or yellow light is desired, a purple film is required. Maximum visual sensitivity falls within this range.

The variations in the colors of the films is of advantage, depending upon the uses to which the glass is to be applied. For instance, when used in instruments that require light of special wave length, the proper film color should be selected to give low reflection in that range.

We claim:

1. The method of treating a glass surface to reduce the reflection of preselected light therefrom, comprising heating the glass to remove adsorbed moisture, exposing said surface to chemical attack by silicon tetrafluoride vapors on the constituents of the glass, continuing such exposure until new compounds have formed at the surface of the glass which have an index of refraction intermediate that of the main body of glass and the surrounding air and are of a thickness of slightly greater than ¼ the wave length of said preselected light, and then heating the glass to produce a chemical change in the film and to reduce the film thickness to approximately ¼ wave length of the preselected light.

2. The method of treating a surface of a glass body to increase the transmission of preselected light therethrough, comprising heating said surface to remove adsorbed moisture, and subjecting the heated surface to the chemical action of silicon tetrafluoride in the vapor phase for a length of time sufficient to produce a transparent film at said surface of a thickness approximately ¼ the wave length of said preselected light.

3. The method of treating a glass body to increase the transmission of preselected light therethrough, comprising heating said body, exposing the heated body to vapors of silicon tetrafluoride until a film forms at the surface of said body of a thickness that is approximately ¼ the wave length of said preselected light.

4. The method of treating a glass surface to reduce the reflection of preselected light therefrom while increasing the transmission of light therethrough, comprising removing adsorbed moisture from the glass, and subjecting said surface to the chemical action of silicon tetrafluoride in the vapor phase for a length of time sufficient to produce a transparent film therebeneath of a thickness that is approximately ¼ the wave length of said preselected light.

5. The method of treating a transparent glass surface to reduce the reflection of preselected light therefrom and to increase the transmission of light therethrough, comprising heating a fluosilicate to a point where vapors arise therefrom, exposing said glass surface to the vapors arising from the heated fluosilicate, and continuing such exposure for a length of time sufficient to produce a transparent film at the glass surface of a thickness approximately ¼ the wave length of said preselected light.

6. The method of reducing the reflection of preselected light from a transparent glass surface, comprising heating said surface, exposing said surface to vapors arising from a heated mixture of calcium fluoride, sulfuric acid and silica, and continuing such exposure for a length of time sufficient to produce a low light reflecting film at the glass surface of a thickness that is approximately ¼ the wave length of said preselected light.

7. The method of treating a transparent glass surface to reduce the reflection of preselected light therefrom and to increase the transmission of light therethrough, comprising heating a combination of fluorides and fluosilicates to a point where vapors arise therefrom, exposing the surface to be treated to said vapors, and continuing such exposure for a length of time sufficient to produce a transparent film at the glass surface of a thickness that is approximately ¼ the wave length of said preselected light.

8. The method of treating a glass surface to reduce the reflection of preselected light therefrom, comprising removing moisture from the glass, subjecting said surface to chemical attack by silicon tetrafluoride in the vapor phase for a length of time sufficient to produce a transparent film therebeneath of a thickness approximately ¼ the wave length of said preselected light, and then heating the glass sufficiently to produce a chemical change in the film and to stabilize the same.

9. The method of treating a glass surface to reduce the reflection of preselected light therefrom while increasing the transmission of light therethrough, comprising subjecting said surface to the chemical action of vapors of silicon tetrafluoride under substantially anhydrous conditions until a transparent film is formed therebeneath of a thickness approximately ¼ the wave length of said preselected light.

10. The method of treating a glass body to increase the transmission of a preselected light therethrough, comprising exposing said body to vapors of silicon tetrafluoride until a film forms at the surface thereof that is approximately ¼ the wave length of said preselected light.

11. The method of treating a glass body to increase the transmission of a preselected light therethrough, comprising exposing said body to vapors of silicon tetrafluoride until a film forms at the surface thereof that is approximately ¼ the wave length of said preselected light, and then producing a chemical change in the film to stabilize the same.

12. The method of treating a glass surface to reduce the reflection of preselected light therefrom, comprising exposing said surface to chemical attack by silicon tetrafluoride vapors on the constituents of the glass, continuing such exposure until new compounds have formed at the surface of the glass which have an index of refraction intermediate that of the main body of glass and the surrounding air and are of a thickness approximately but slightly greater than ¼ the wave length of the preselected light, and then heating the film to produce a chemical change in the film and to reduce the film thickness to more nearly ¼ wave length of the preselected light.

13. The method of treating a glass body to increase the transmission of preselected light therethrough, comprising exposing said body to vapors of silicon tetrafluoride emanating from a source outside of said body until a film forms at the surface of the body that will reduce the reflection of said preselected light therefrom.

ROMEY A. GAISER.
MILTON F. SCHAIBLE.

REFERENCES CITED

The following references are of record in the file of this patent:

UNITED STATES PATENTS

| Number | Name | Date |
|---|---|---|
| 276,894 | Berge | May 1, 1883 |
| 1,584,728 | Case | May 18, 1926 |
| 1,760,427 | Matlock, Jr. | May 27, 1930 |
| 1,899,485 | Smith | Feb. 28, 1933 |
| 1,964,322 | Hyde | June 26, 1934 |
| 1,980,021 | Wetherbee | Nov. 6, 1934 |
| 2,118,386 | Swinehart | May 24, 1938 |
| 2,122,512 | Calkins et al. | July 5, 1938 |
| 2,137,683 | Flaherty | Nov. 22, 1938 |
| 2,202,326 | Willson | May 28, 1940 |
| 2,215,039 | Hood et al. | Sept. 17, 1940 |
| 2,220,862 | Blodgett | Nov. 5, 1940 |
| 2,281,475 | Cartwright et al. | Apr. 28, 1942 |
| 2,282,677 | Rayton | May 12, 1942 |
| 2,337,460 | French | Dec. 21, 1943 |
| 2,338,234 | Dimmick | Jan. 4, 1944 |
| 2,369,741 | Jones et al. | Feb. 20, 1945 |

FOREIGN PATENTS

| Number | Country | Date |
|---|---|---|
| 102,412 | Australia | Nov. 2, 1937 |
| 29,561 | Great Britain | of 1904 |

OTHER REFERENCES

Watts' Dictionary of Chemistry, vol. 2, 1889, pages 558 to 560, pub. Longmans, Green and Co., N. Y.

Jones et al.: J. O. S. A., vol. 31, January 1941, p. 34–37.

Nicol: International Projectionist, July 1942, pages 9–11.

Mellor: Treatise on Organic and Theoretical Chemistry, vol. VI, page 943, pub. Longmans, Green and Co., N. Y.